United States Patent [19]
Chen et al.

[11] Patent Number: 5,806,062
[45] Date of Patent: Sep. 8, 1998

[54] DATA ANALYSIS SYSTEM USING VIRTUAL DATABASES

[75] Inventors: Yih-Farn Robin Chen, Bridgewater; Glenn Stephen Fowler, Scotch Plains; Elefterios Koutsofios, Chatham; Ryan S. Wallach, East Brunswick, all of N.J.

[73] Assignee: Lucent Technologies Inc., Murray Hill, N.J.

[21] Appl. No.: 544,346

[22] Filed: Oct. 17, 1995

[51] Int. Cl.$^6$ ...................................................... G06F 17/30
[52] U.S. Cl. ..................... 707/4; 707/1; 707/5; 395/712; 395/703
[58] Field of Search ................... 395/604, 619, 395/712; 707/1, 5, 4

[56] References Cited

U.S. PATENT DOCUMENTS 5,634,053  5/1997  Noble et al. ............................. 395/604
5,659,724  8/1997  Borgida et al. .......................... 395/603

OTHER PUBLICATIONS

Glenn Fowler "A flat file database query language", AT&T, 4–3–2–2, Jan. 1994.
Yih–Farn Chen "A tool to generate program graphs", AT&T, 4–3–2–2, Apr. 1994.
Ramamoorthy et al., "The C information abstracttion system", IEEE, vol. 16, No. 3, Mar. 1990.

*Primary Examiner*—Paul V. Kulik
*Assistant Examiner*—Jean M. Corrielus

[57] ABSTRACT

A data processing apparatus and method for creating data analysis applications using reusable software operators. An initial operator is provided for converting source information into a virtual database format. Query operators are provided for receiving data in a virtual database format, processing the data in the virtual database, and outputting the results of the processing in another virtual database which has the same schema as the received virtual database. A plurality of query operators may be combined in order to customize the processing of the virtual database data. A terminal operator is provided for converting data in a virtual database into an external format which may then be further processed by an external operator. By combining initial, query, terminal, and external operators, users may create customizable data processing applications. In accordance with one embodiment of the invention, operators are provided for analyzing the difference between a first document and a second document. An initial operator converts the documents into a virtual database format containing information about the structure of the documents. A differencing operator compares the virtual databases and creates a virtual database containing difference information. Terminal and external operators are provided for converting the difference information into a directed graph layout which graphically represents the difference information and which is displayed through a graphical interface. In accordance with a further aspect of the invention, additional difference analysis processing may be initiated through the graphical interface.

46 Claims, 12 Drawing Sheets

FIG. 4

```
1   #define MAX 3
2   int v;
3   typedef int *pointer;
4   void main()
5   {
6     pointer p;
7     v=MAX;
8     p=&v;
9   }
```

FIG. 5

```
1   #define MAX 3
2   #define MIN 1
3   int v=MAX;
4   typedef int *pointer;
5   main()
6   {
7     pointer p;
8     v=v-MIN;
9     p=&v;
10    end();
11  }
12  void end() {}
```

```
701 { ; vdb; CIAO/cc
     ┌ ENTITY                                                         ╱708
     │  2c35de1b; fl.c; f; 2c35de1b; ; n; 1; 9; 9; df; ca931c21;  ╱
     │  a4e18b42; main; p; 2c35de1b; void; g; 4; 4; 9; df7b49619f; ──710
702 ─┤  cac06b0a; v; v; 2c35de1b; int; g; 2; 0; 2; df; 7bbe087d; ──712
     │  b0476c43; MAX; m; 2c35de1b; ; d; 1; 0; 1; df; 88b9eb39;
     └  2d64b5e9; pointer; t; 2c35de1; int*; t; 3; 0; 3; df; 9496dcf9;
     ┌ RELATIONSHIP
     │  p; a4e18b42; m; b0476c43; 7 ──720
704 ─┤  p; a4e18b42; t; 2d64b5e9; 6
     └  p; a4e18b42; v; cac06b0a; 7@8
     ┌ DIRECTORY
     │  ENTITY; 20; 246 ──730
706 ─┤  RELATIONSHIP; 279; 74 ──732
     └  DIRECTORY; 0000000363; 0000000066 ──734
```

```
; VDB; ciao/CC
ENTITY
2c35de1b; fl.c; f; 2c35de1b; ; n; 1; 12; 12; df; ca1899bd;
b69d7941; MIN; m; 2c35de1b; ; d; 2; 0; 2; df; 592a7685;
fe10a67; end; p; 2c35de1b; void; g; 12; 12; 12; df; 44a81859;
a4e18b42; main; p; 2c35de1b; int; g; 5; 5; 11; df; c42063a5;
cac06b0a; v; v; 2c35de1b; int; g; 3; 0; 3; df; 7bbe087f;
b0476c43; MAX; m; 2c35de1b; ; d; 1; 0; 1; df; 88b9eb39;
2d64b5e9; pointer; t; 2c35de1b; int*; t; 4; 0; 4; df; 9496dcf9;
RELATIONSHIP
p; a4e18b42; t; 2d64b5e9; 7
p; a4e18b42; m; b69d7941; 8
v; cac06b0a; m; b0476c43; 3
P; a4e18b42; v; cac06b0a; 8@9
p; a4e18b42; p; fe10a67; 10
DIRECTORY
ENTITY; 20; 346
RELATIONSHIP; 379; 122
DIRECTORY; 0000000511; 0000000067
```

FIG. 11

```
                                              314
         ; vdb; CIAO/ccdf
         ENTITY
1108     2c35de1b; f1.c; c, f; 2c35de1b; ; n; 1; 12; 12; df; ca1899bd;
         b0476c43; MAX; s, m; 2c35de1b; ; d; 1; 0; 1; df; 88b9eb39;
    1106{ b69d7941; MIN; a, m; 2c35de1b; ; d; 2; 0; 2; df; 592a7685;
         fe10a67; end; a, p; 2c35de1b; void; g; 12; 12; 12; df; 44a81859;   } 1102
1112     a4e18b42; main; c, p; 2c35de1b; int; g; 5; 5; 11; df; c42063a5;
         2d64b5e9; pointer; s, t; 2c35de1b; int*; t; 3; 0; 3; df; 9496dcf9;
    1110{ cac06b0a; v; c, v; 2c35de1b; int; g; 3; 0; 3; df; 7bbe087f;
         RELATIONSHIP
1118     s; p; a4e18b42; t; 2d64b5e9; 6
    1114{ d; p; a4e18b42; m; b0476c43; 7
         a; p; a4e18b42; m; b69d7941; 8                                    } 1104
1120  1122{ s; p; a4e18b42; v; cac06b0a; 7@8
         a; p; a4e18b42; p; fe10a67; 10
    1116{ a; v; cac06b0a; m; b0476c43; 3
         DIRECTORY
         ENTITY; 22; 360
         RELATIONSHIP; 395; 158
         DIRECTORY; 0000000563; 0000000067
```

FIG. 12

```
                                              318
         ; vdb; CIAO/ccdf
         ENTITY
         a4e18b42; main; c, p; 2c35de1b; int; g; 5; 5; 11; df; c42063a5; y
         2d64b5e9; pointer; s, t; 2c35de1b; int*; t; 3; 0; 3; df; 9496dcf9; y
    1220{ 2c35de1b; f1.c; c, f; 2c35de1b; ; n; 1; 12; 12; df; ca1899bd; n ——1221
         b0476c43; MAX; s, m; 2c35de1b; ; d; 1; 0; 1; df; 88b9eb39; y
         b69d7941; MIN; a, m; 2c35de1b; ; d; 2; 0; 2; df; 592a7685; y
         cac06b0a; v; c, v; 2c35de1b; int; g; 3; 0; 3; df; 7bbe087f; y
         fe10a67; end; a, p; 2c35de1b; int; g; 3; 0; 3; df; 7bbe087f; y
         fe10a67; end; a, p; 2c35de1b; void; g; 12; 12; 12; df; 44a81859; y
         RELATIONSHIP
    1202{ s; p; a4e18b42; t; 2d64b5e9; 6
    1204{ d; p; a4e18b42; m; b0476c43; 7
    1206{ a; p; a4e18b42; m; b69d7941; 8
    1208{ s; p; A4e18b42; v; cac06b0a; 7@8
    1210{ a; p; a4e18b42; p; fe10a67; 10
         DIRECTORY
         ENTITY; 22; 367
         RELATIONSHIP; 402; 132
         DIRECTORY; 0000000544; 0000000067
```

FIG. 13

```
digraph G {
size="7.50,10.00";
rankdir=LR;
node [shape=box];
"a4e18b42" [label="main",kind="p",file="f1.c",shape=parallelogram]
"2d64b5e9" [label="pointer",kind="t",file="f1.c",shape=box]
"b0476c43" [label="MAX",kind="m",file="f1.c",shape=box]
"b69d7941" [label="MIN",kind="m",file=f1.c",shape=ellipse]
"cac06b0a" [label="v",kind="v",file=f1.c",shape=parallelogram]
"fe10a67" [label="end",kind="p",file="f1.c",shape=ellipse]
"a4e18b42"->"2d64b5e9" [];
"a4e18b42"->"b0476c43" [style=dotted];
"a4e18b42"->"b69d7941" [style=dashed];
"a4e18b42"->"cac06b0a" [];
"a4e18b42"->"fe10a67" [style=dashed];
}
```

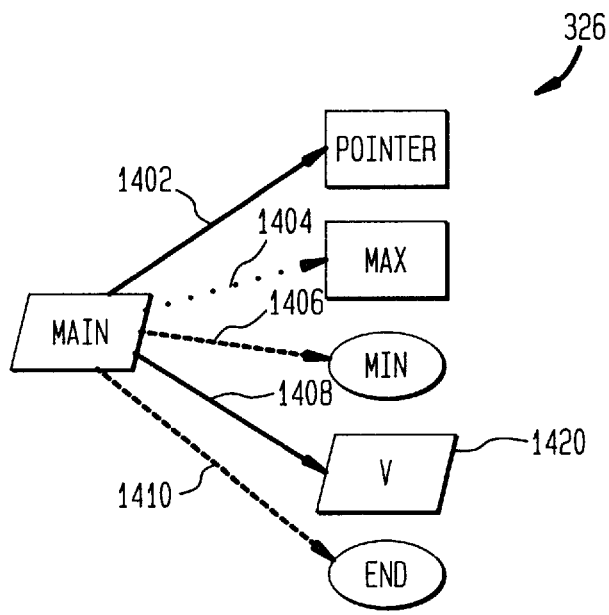

FIG. 15

```
       1502 1504 1506    1508              1500
1510 { s, p; box; filled; lightseagreen
       c, p; box; filled; yellow
       a, p; box; filled; tomato
       d, p; box; ;
       s, f; parallelogram; filled; lightseagreen
       c, f; parallelogram; filled; yellow
       a, f; parallelogram; filled; tomato
       d, f; parallelogram; ;
       s, v; ellipse; filled; lightseagreen
       c, v; ellipse; filled; yellow
       a, v; ellipse; filled; tomato
       d, v; ellipse; ;
       s, m; trapezium; filled; lightseagreen
       c, m; trapezium; filled; yellow
       a, m; trapezium; filled; tomato
       d, m; trapezium; ;
       s, t; diamond; filled: lightseagreen
       c, t; diamond; filled; yellow
       a, t; diamond; filled; yellow
       a, t; diamond; filled; tomato
       d, t; diamond; ;
```

FIG. 16

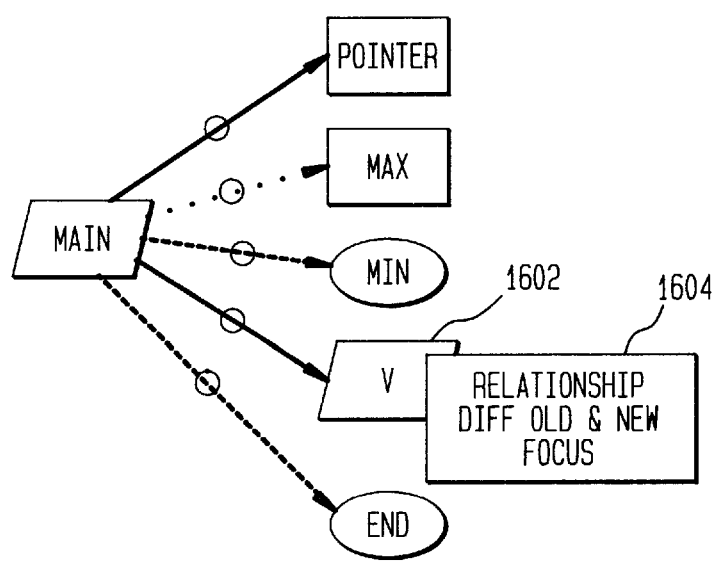

DATA ANALYSIS SYSTEM USING VIRTUAL DATABASES

FIELD OF THE INVENTION

The present invention relates generally to data analysis systems. In particular, the present invention relates to a data analysis system in which software operators process virtual databases.

BACKGROUND OF THE INVENTION

Various types of documents may be stored in a computer system. For example, a computer program is a type of document. Other types of documents include word processing files, World Wide Web (WWW) documents (i.e. html documents), financial files, employee files, software manuals, machine configuration files, etc. When dealing with large or complex documents, it is often desirable to analyze the structure of the documents. For example, with respect to computer programs, it may be desirable to analyze the dependency relationships between various sections of the code, or to compare a first version of the program to a second version of the program.

In order to aid such analysis, a database may be constructed which contains information describing the structure of the documents. Various database queries may be performed in order to extract and process information describing the structure of the source documents. A collection of source documents, along with an associated database which describes the structure of the documents, is called a repository.

In order to analyze source document information, it is necessary to process information contained in the repository. A computer program that extracts or converts information from a repository is called an operator. Thus, an operator receives a source document and/or a database as input, processes the input, and produces some output. A simple example of an operator is a program which takes a source document as input and counts the number of occurrences of a particular word, and outputs a number containing the number of times the particular word occurs. The overall function of the analysis, in the above example a count of the number of occurrences of a particular word, is called an application.

In existing repository analysis systems, the operators are generally designed for a single application. Thus, the user indicates which operator he/she wishes to apply to the repository, and the system processes the repository accordingly. The user is presented with the output when the processing is finished. Different operators process the repository in a different manner, and there is no convenient mechanism for combining the various operators to create new applications. Thus, when a new application is desired, a new operator must be designed from scratch.

In addition, existing repository analysis systems are generally closed systems, in that all operators are applied within the confines of the system, and all database accesses are performed within the system. For example, a repository analysis system operator may produce as output a file containing information about the structure of a computer program. In conventional closed systems, this output cannot be further processed by, for example, an external graphics program which will format the output in a desired manner. Instead, the output may only be formatted according to operators which are internal to the repository system. There is no convenient mechanism to allow the repository analysis system to communicate with operators which are external to the system.

SUMMARY OF THE INVENTION

The present invention provides an apparatus and method for creating data analysis applications using reusable software operators. Query operators receive data in a particular virtual database format, process the data in the virtual database, and output the results of the processing in another virtual database which has the same format as the received virtual database. Query operators may be combined in various ways to allow users to create customizable data analysis applications. In addition to query operators, initial operators are provided which convert source information into the virtual database format so that the query operators can analyze the source data. Further, terminal operators are used to convert a virtual database into an external format. This is useful in that the external format data may be processed in various ways, thus allowing flexible presentation of the analysis results. These software operators may be combined to create customizable data analysis applications.

In one embodiment, the software architecture of the present invention is used to create a document differencing application in which the differences between a first document and a second document are analyzed. An abstractor operator processes a first document and a second document and creates a first virtual database and a second virtual database. The first virtual database contains information describing the structure of the first document, and the second virtual database contains information describing the structure of the second document. A differencing operator is applied to the first and second virtual databases. The differencing operator analyzes the differences between the documents and creates a third virtual database which contains the difference information. A filter operator may be applied to the third virtual database to filter out unwanted information, resulting in a fourth virtual database. A terminal operator is applied to the fourth virtual database to create an external format file containing the desired information. This external format file is then processed by an external operator to present the information to the user.

In accordance with another aspect of the invention, document difference information is presented to the user as a directed graph via a graphical interface such as a display monitor or printer. Document entities are represented as nodes in the graph and relationships between entities are represented as edges connecting the nodes. Difference information may be encoded in various display characteristics of the nodes and edges. In addition, further document difference queries may be initiated through a display monitor graphical interface.

These and other advantages of the invention will be apparent to those of ordinary skill in the art by reference to the following detailed description and the accompanying drawings.

BRIEF DESCRIPTION OF THE DRAWINGS

FIG. 4 shows a first version of an example C program.

FIG. 5 shows a second version of an example C program.

FIG. 7 shows the contents of an example virtual database.

FIG. 8 shows the contents of an example virtual database.

FIG. 11 shows the contents of an example virtual database.

FIG. 12 shows the contents of an example virtual database.

FIG. 13 shows the contents of an example external format file.

FIG. 14 shows an example graph layout.

FIG. 15 shows the contents of an example decoration database.

FIG. 16 shows an example interactive display of a directed graph.

DETAILED DESCRIPTION

Figure 1:
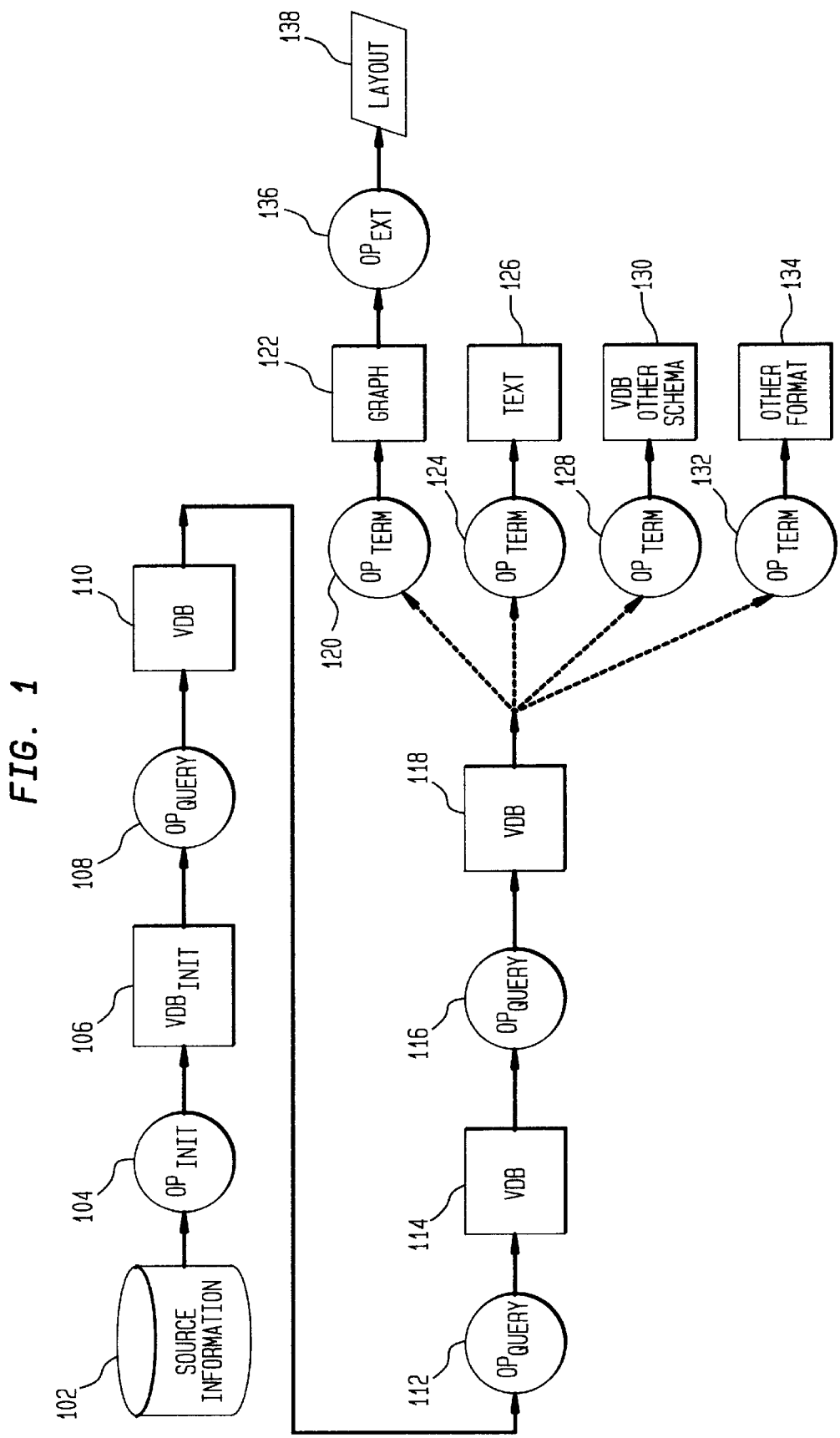
FIG. 1 illustrates the software architecture of the invention.

FIG. 1 illustrates the software architecture of the present invention. Source information 102 consists of information which is to be analyzed. Such information may be, for example, a computer program, a database, or other document. An initial operator 104 takes the source information 102 as input and creates an initial virtual database 106. A virtual database is a sequence of characters organized into one or more sections. Each section contains zero or more records, with each record made up of one or more fields containing information. Each section of the virtual database has an associated schema which describes the format of the records and fields. The virtual database itself has a schema which describes the format of the entire virtual database. The schema of the virtual database includes the schemas of each of the sections.

A virtual database (VDB), such as initial VDB 106, is self contained and may be operated on further by other operators. A VDB is self contained, in that if a record is referred to in a field in the VDB, then the referred to record is contained in the VDB. The self contained characteristic of a VDB will be discussed further below in conjunction with the exemplary embodiment.

All VDB's which have the same schema have the same structure, and store information in a particular format. Thus, an initial operator, such as initial operator 104 takes source information in some external format (represented as X), and operates on that source information to create a VDB of a particular schema (represented as V). Thus, the functioning of an initial operator can be represented as: init-op (X)→V.

A second type of operator is a query operator, such as query operator 108. A query operator takes a VDB of a given schema, performs an operation on the VDB, and outputs another VDB of the same schema. The functioning of a query operator can be represented as query-op(V)→V. As shown in FIG. 1, query operator 108 takes VDB 106 as input, processes the information in VDB 106, and creates VDB 110. VDB 106 and VDB 110 have the same schema. Since the input and output to a query operator is a VDB of a particular schema, any number of query operators may be connected to process information. Thus, such query operators may be used as reusable components that receive and produce VDBs of a particular format. Such a plug-compatible architecture allows for the combination of operators in different ways to allow users to customize data processing applications using standard query operators as components. As shown in FIG. 1, query-operator 112 receives VDB 110, processes the information and produces VDB 114. Operator query 116 receives VDB 114, processes the information and produces VDB 118. VDBs 106, 110, 114, and 118 all have the same schema.

A third type of operator is a terminal operator. A terminal operator takes a VDB and converts the VDB to some external format. Thus, the functioning of a terminal operator can be represented as: term-op (V)→X. Examples of terminal operators are shown in FIG. 1 as 120, 124, 128 and 132. Terminal-operator 120 converts VDB 118 to a graph format file 122. Terminal operator 124 converts VDB 118 to text format file 126, which may be further processed by text processing software. Terminal operator 128 converts VDB 118 to a VDB of a schema other than the schema of VDB 118. This may be desirable so that the VDB 130 may be processed by another set of query operators which operate on such other schema. Terminal operators 120, 124, and 128 illustrate various types of operations performed by terminal operators. It is to be understood that there are other terminal operator functions, and these are represented by terminal operator 132 which receives VDB 118 and converts it to some other format 134 for further processing.

A fourth type of operator is an external-operator. External operators take some external format as input, and create another external format as output. Thus, the functioning of an external operator can be represented as: ext-op (X)→X. An example of a terminal operator is shown in FIG. 1 as 136. This external operator takes a graph format file 122 and converts it to a layout 138 which may be viewed by a user.

Figure 2:
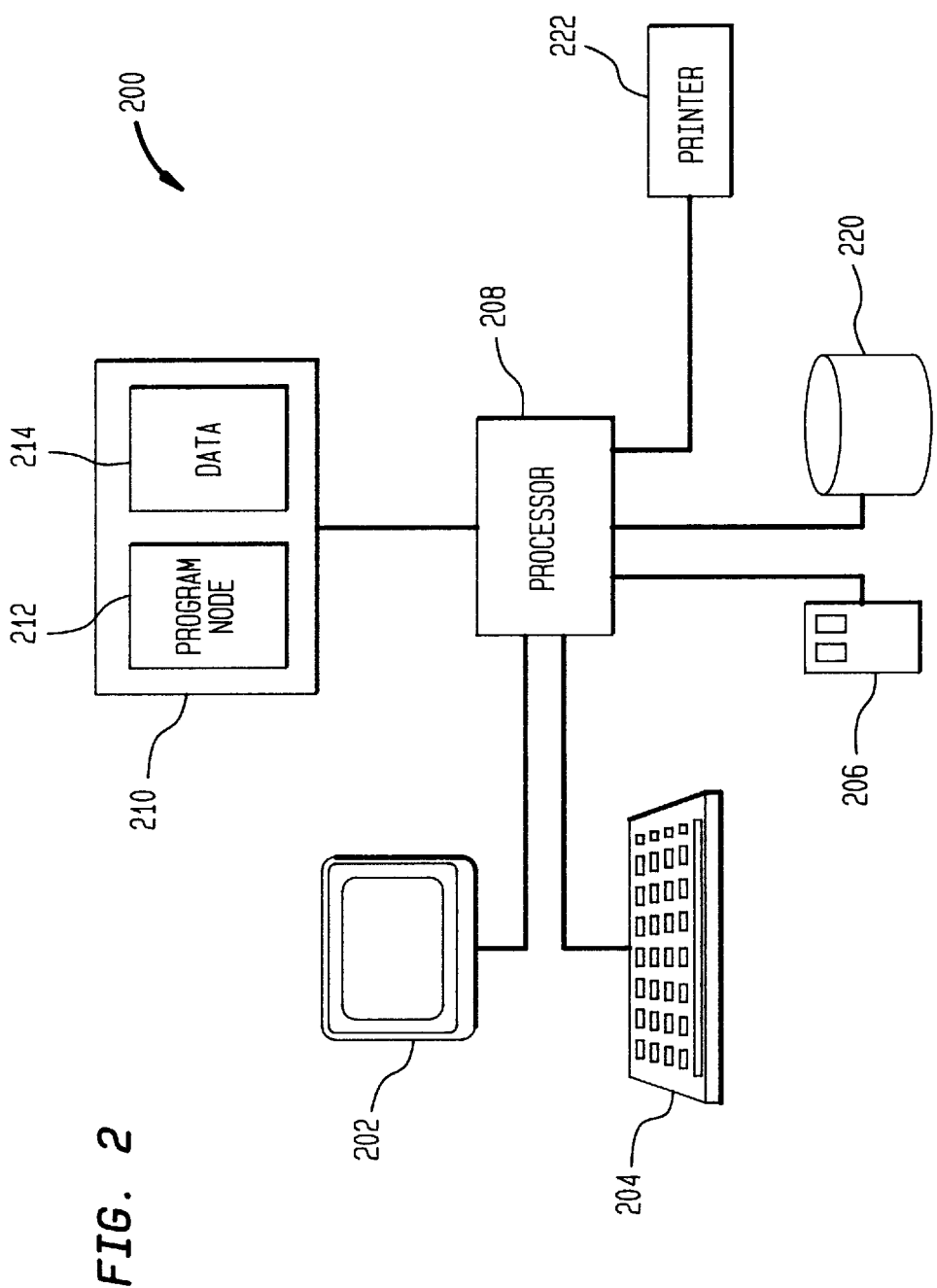
FIG. 2 shows a schematic of the components of a computer system which can be configured to implement the invention.

The present invention may be advantageously implemented using a programmed digital computer of the type which is well known in the art, an example of which is shown in FIG. 2. As used herein, the term computer includes any device or machine capable of accepting data, applying prescribed processes to the data, and supplying the results of the processes. FIG. 2 shows a computer system 200 which comprises a display monitor 202, a textual input device such as a computer keyboard 204, a graphical input device such as a mouse 206, a computer processor 208, a memory unit 210, a printer 222 and a non-volatile storage device such as a disk drive 220. The memory unit 210 includes a storage area 212 for the storage of, for example, computer program code, and storage area 214 for the storage of data. The computer processor 208 is connected to the display monitor 202, the memory unit 210, the non-volatile storage device 220, the keyboard 204, the printer 222 and the mouse 206. The external storage device 220 may be used for the storage of data and computer program code. The computer processor 208 executes the computer program code which is stored in storage area 212 in the memory unit 210. During execution, the processor may access data in storage space 214 in the memory unit 210, and may access data stored in the non-volatile storage device 220. The computer system 200 may suitably be any one of the types which are well known in the art such as a mainframe computer, a minicomputer, a workstation, or a personal computer. In one embodiment, the computer system 200 operates under control of the UNIX operating system.

As shown in FIG. 1, virtual databases are passed from one operator to the next in order to process the information contained in the VDBs. As discussed above, this plug-compatible architecture provides a flexible processing environment and allows for user customization of data analysis applications using various operators. In an advantageous embodiment, the mechanism for passing the VDBs from one operator to the next is through the use of a UNIX pipe. A pipe is an operating system mechanism that allows two processes (operators in the present description) to exchange information as streams of characters. In FIG. 1, operator 104 writes the set of characters that represent VDB 106 to an outgoing pipe. Process 108 reads these characters and reconstructs the structure of VDB 106, operator 108 generates VDB I 10, and writes VDB 110 to an outgoing pipe. An arbitrary number of operators can be combined using a pipeline. Such a mechanism for passing VDBs from one operator to another is called a virtual database pipeline.

The UNIX program "ksh" provides facilities for creating such pipelines easily. The concept of pipelines is available on other operating systems as well, such as Windows NT. In operating systems that do not support pipelines, pipelines can be implemented using shared memory or message passing. UNIX pipes are further described in B. Kernighan and R. Pike, *The UNIX Programming Environment*, Prentice-Hall Software Series, 1984, e.g. pgs. 31–33, which is incorporated herein by reference. Thus, in this embodiment, an operator pipes its output database to another operator via a UNIX pipe.

There are alternate techniques for passing VDBs between operators. For example, VDBs could be stored in files. Thus, a query operator could read a VDB file, process the information, and write further information to another VDB file. Other techniques for passing VDBs between operators, other than virtual database pipelines and files, could be implemented by one skilled in the art.

Users of a computer system which embodies the present invention may be provided with a library of reusable operators which may be applied to various data. Providing users with access to such a library allows the users to combine the operators to create customizable applications.

Figure 3:
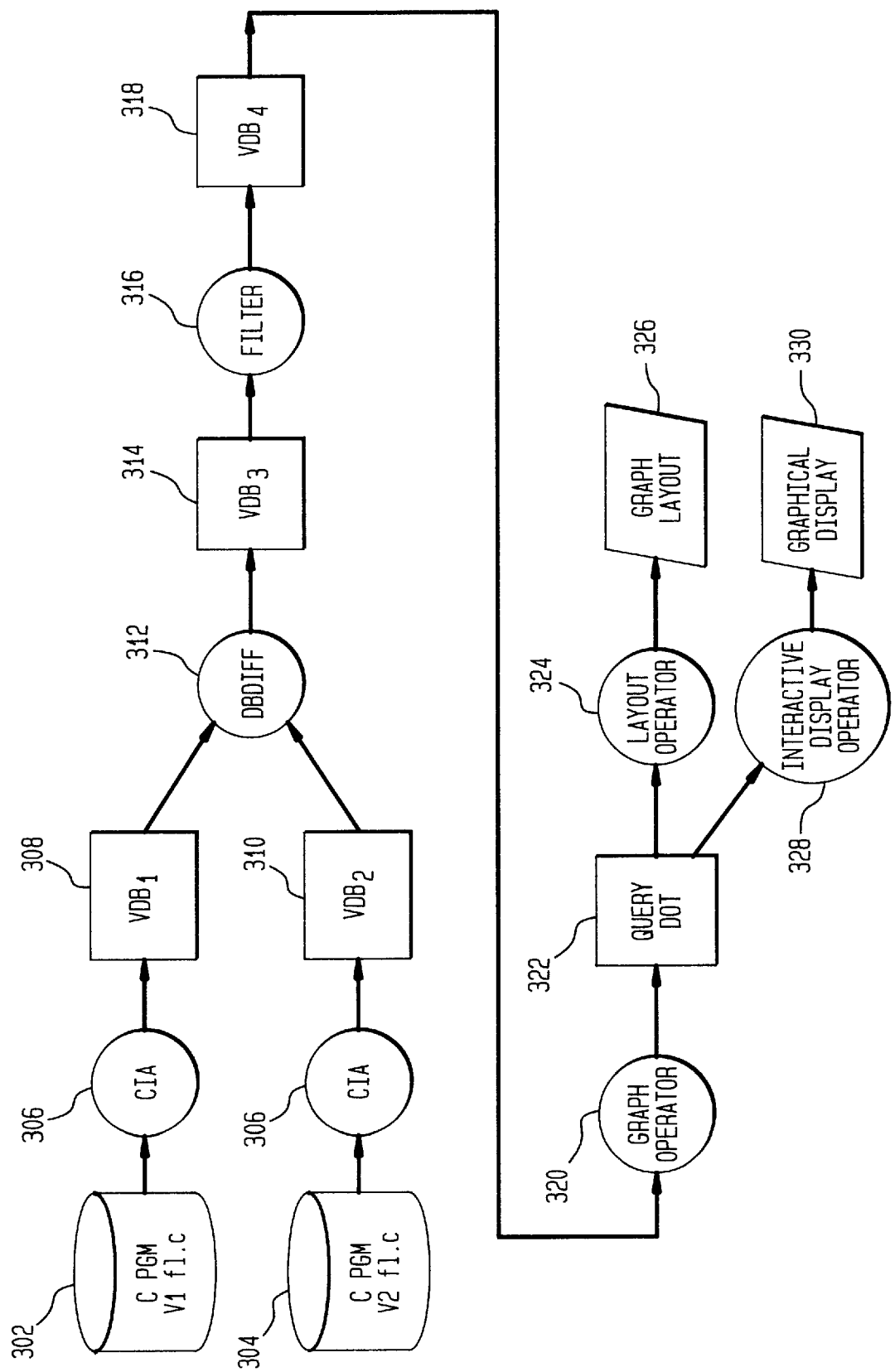
FIG. 3 shows the software architecture of a C program differencing embodiment of the invention.

In one particular embodiment of the invention the software architecture shown in FIG. 1 is used to analyze the structural difference between two computer programs written in the C language. Such a difference analysis is useful to determine how a computer program changes from one version to another. This embodiment of the invention is illustrated in FIG. 3. A first version of a C program 302 is to be compared with a second version of a C program 304. C program version one 302 is shown in FIG. 4 and C program version two 304 is shown in FIG. 5. The line numbers in FIGS. 4 and 5 are for reference only, and are not part of the actual program.

The differencing analysis of the presently described embodiment is based upon an entity relationship analysis. For purposes of the present embodiment, a C program is considered to be made up of 5 types of entities: variables, files, macros, functions, and types. With respect to this particular embodiment, only non-local variables and types are considered. These entities are well known to one of ordinary skill in the art of C programming, and will therefore not be described in detail herein. A relationship exists between an entity A and an entity B if the definition of entity A refers to entity B. In other words, entity A refers to entity B if A cannot be compiled and executed without the definition of B. In such a relationship, A is considered the parent and B is considered the child. Such entity-relationship information of a C program is further described in Chen, Yih-Farn, *The C Program Database and Its Applications*, in Proceedings of the Summer 1989 USENIX Conference, pages 157–171, USENIX Association, June 1989, which is incorporated by reference herein.

C program version one 302 and C program version two 304 are processed by a C information abstractor operator 306. Operator 306 is an initial operator because it receives an external format, the C program code here, and converts it to a virtual database. A suitable C information abstractor operator 306 for use with the present invention may be constructed with reference to the CIA C information abstractor which is described in Chen, Yih-Farn, *Reverse Engineering*, Practical Reusable UNIX Software, pgs. 177–208, chapter 6, editor B. Krishnamurthy, publisher John Wiley & Sons, New York, 1995, which is incorporated by reference herein. Further information on CIA may be found in Chen, Yih-Farn, Nishimoto, Michael Y., and Ramamoorthy, C.V., *The C Information Abstraction System*, IEEE Transactions on Software Engineering, Vol. 16, No. 3, March 1990, pp. 325–334, which is incorporated by reference herein. Other suitable C information abstractors may be used to generate VDBs 308 and 310. Such suitable C information abstractors must generate VDBs which contain the entity-relationship information described herein.

The CIA operator 306 produces VDB 308 when operating on C program version one 302, and produces VDB 310 when operating on C program version two 304. VDBs 308 and 310 contain entity-relationship information from the C programs 302 and 304 respectively.

Figure 6:
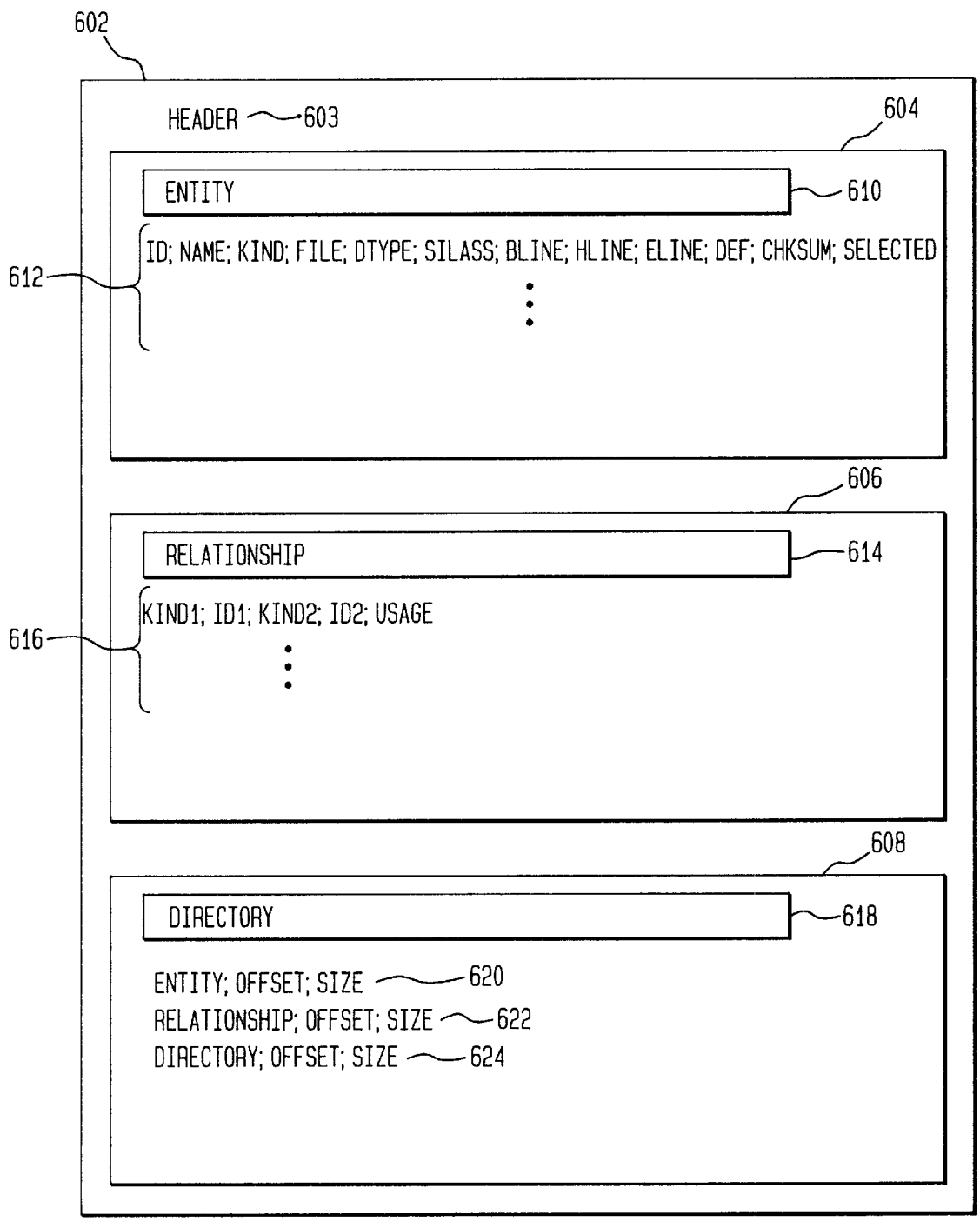
FIG. 6 shows the schema of an example virtual database.

The schema of VDB 308 and VDB 310 is described in conjunction with FIG. 6, which shows a representation of a VDB 602, and shows the VDB 602 as containing a header and three sections. The header 603 identifies the VDB as a virtual database, and may contain other implementation specific information, such as programming language, system identification, etc. The first section of VDB 602 is the entity section 604. The entity section 604 is delimited by a section heading ENTITY 610. The section heading is followed by lines 612, with each line representing a virtual database record and containing information defining one entity. Each line (i.e. record) contains the following fields:

id: a unique identification of the entity. In the embodiment described herein, the entity identification is computed by using a checksum computed from the file, kind, and name fields.

name: the name of the entity.

kind: the type of the entity. There are 5 entity types: file (f), function (p), variable (v), macro (m) and type(t). These types are defined in accordance with conventional C program usage.

file: the file which contains the entity.

dtype: the data type of the entity sclass: the storage class of the entity. There are 8 storage classes: typedef(t), macdef(d), extern(e), enum(m), global(g), macudef(u), static(s), libsym(l). This field may also contain "n" if the entity does not have a storage class.

bline: the beginning line of the entity in the file hline: used only for function(p) and file(f) entities. For function entities this field indicates the ending line of the function header. For file entities, this field represents the total number of lines in the file after C language pre-processing.

eline: the ending line of the entity in the file.

def: indicates whether the entity is defined(df), declared (dc), or undefined(ud).

chksum: the checksum of the entity. In one embodiment, the checksum is computed from text tokens of the entity.

selected: this field is used only for VDBs which are output from query operators. A "y" in this field indicates that the record was selected by the query. A "n" in this field indicates that the record is only included in the VDB to satisfy the above described constraint that a VDB is self contained. Thus, a non-selected record may be included in a VDB not because it was selected by a query, but because one of the fields of a record which was selected by the query refers to the nonselected record. The use of the selected field will be described in further detail below in conjunction with the exemplary embodiment.

Taken together, the above fields describe an entity of the C program being analyzed. The second section of VDB 602 is the relationship section 606. The relationship section 606 is delimited by a section heading RELATIONSHIP 614. The section heading is followed by lines 616, with each line representing a virtual database record and containing information defining one relationship. Each line (i.e. record) contains the following fields:

kind1: the entity kind of the parent entity of the relationship.

id 1: the ID of the parent entity of the relationship.

kind2: the entity kind of the child entity of the relationship.

id2: the ID of the child entity of the relationship.

usage: the line number of the C program where the relationship occurs.

Taken together, the above fields define an entity relationship in the C program being analyzed.

The third section of VDB 602 is the directory section 608. The directory section is delimited by a section heading DIRECTORY 618. The section heading is followed by three lines 620, 622, 624 which act as a directory to the entity section 610 and the relationship section 606 of VDB 602. Line 620 contains the identifier ENTITY, followed by an offset and a size. The offset identifies the beginning character of the entity section 604 relative to the beginning of the file, and the size identifies the length of the entity section 604. Line 622 contains the identifier RELATIONSHIP, followed by an offset and a size. The offset identifies the beginning character of the relationship section 606 relative to the beginning of the file, and the size identifies the length of the relationship section 606. Line 624 contains the identifier DIRECTORY followed by an offset and a size. The offset identifies the beginning character of the directory section 608 relative to the beginning of the file, and the size identifies the length of the directory section 608.

Virtual databases which may be used in conjunction with the present invention may be of the type which are described in Fowler, Glenn, cql—*A Flat File Database Query Language*, USENIX Winter 1994 Conference, San Francisco, pages 11–21, January 1994, which is incorporated by reference herein. Other types of virtual databases may also be implemented by one skilled in the art.

The VDB 308 which results from applying the CIA operator 306 to the C program version one 302 is shown in FIG. 7. VDB 308 contains a header 701, an entity section 702, a relationship section 704 and a directory section 706. The header 701 contains ";vdb" which identifies VDB 308 as a virtual database. The characters following the second ";" in the header 701 are comments, and may be used to describe certain implementation specific details. In the embodiment described herein, "CIAO/cc describes the name of the particular implementation. The entity section contains 5 lines, and thus contains information on five entities of C program version one 302 which is shown in FIG. 5.

Line 708 of VDB 308 describes the file entity f1.c. It is assumed that this is the file which contains the C program version one. The first field (ID) contains "2c35de1b" which is the unique identification assigned to this entity. The second field (name) contains "f1.c" which is the name of the entity. The third field (kind) contains "f", which indicates that this entity is a file. The fourth field (file) contains "2c35de1b" which indicates the file which contains the entity. Since this entity is itself a file, it refers to its own ID. The fifth field (dtype) is null, because a file does not have a datatype. The sixth field (sclass) contains "n" because files do not have a storage class. The seventh field (bline) contains "1", which indicates that the file begins at line 1. The eighth field (hline) contains "9", which indicates the size of the file after C pre-processing. The ninth field (eline) contains "9", which indicates the ending line of the file. The tenth field (def) contains "df" which indicates that the file is defined. The eleventh field (chksum) contains "ca931c21", which is the checksum of the entity. The twelfth field (selected) is only used for VDBs which are output from a query operator. Since operator 306 is not a query operator, the selected field is not used in VDB 308 and is therefore blank.

Line 710 of VDB 308 describes the function entity main. The first field (ID) contains "a4e18b42" which is the unique identification assigned to this entity. The second field (name) contains "main" which is the name of the entity. The third field (kind) contains "p", which indicates that this entity is a function. The fourth field (file) contains "2c35de1b" which is the identification of the file fl.c, which was defined in line 708. This field indicates that the entity "main" is contained in file fl.c. The fifth field (dtype) is void, because the function is defined in the program as having the datatype void. The sixth field (sclass) contains "g" which indicates that main is a global function. The seventh field (bline) contains "4", which indicates that the function "main" begins on line 4 of the file. The eighth field (hline) contains "4", which indicates that the end of the function header is at line 4. The ninth field (eline) contains "9", which indicates that the function "main" ends on line 9 of the file. The tenth field (def) contains "df" which indicates that the function is defined. The eleventh field (chksum) contains "7b49619f", which is the checksum of the entity. The twelfth field (selected) is not used and is therefore blank.

Line 712 of VDB 308 describes the variable "v". The first field (ID) contains "cac06b0a" which is the unique identification assigned to this entity. The second field (name) contains "v" which is the name of the entity. The third field (kind) contains "v", which indicates that this entity is a variable. The fourth field (file) contains "2c35de1b" which is the identification of the file f1.c, which was defined in line 708. This field indicates that the entity "v" is contained in file f1.c. The fifth field (dtype) is "int", because the variable is defined in the program as having the datatype int. The sixth field (sclass) contains "g" which indicates that "v" is a global variable. The seventh field (bline) contains "2", which indicates that the variable "v" begins on line 2 of the file. The eighth field (hline) contains "0" because this field is not used for variables. The ninth field (eline) contains "2", which indicates that the variable "v" ends on line 2 of the file. The tenth field (def) contains "df" which indicates that the variable is defined. The eleventh field (chksum) contains "7bbe087d", which is the checksum of the entity. The twelfth field is not used and is therefore blank.

The remaining lines in the entity section 702 of VDB 308 will not be described in detail. One skilled in the art could readily understand the remaining lines in the entity section 702 given the above description of lines 708, 710, and 712.

The contents of the relationship section 704 of VDB 308 will now be described. Line 720 describes the relationship between the function entity main and the macro entity MAX. The first field (kind1) of line 720 contains "p", which indicates that the parent entity of the relationship defined by line 720 is a function. The second field (id1) contains "a4e18b42" which indicates the unique identification of the parent entity. Referring back to line 710 of the entity section 712 of VDB 308, it is seen that the entity with the identification "a4eI8b42" is the function "main", and thus the function "main" is the parent entity. The third field (kind2) of line 720 contains "m", which indicates that the child entity of the relationship is a macro. The fourth field (id2) contains "b0476c43" which indicates the unique identification of the child entity. Referring back to the entity section 712 of VDB 308, it is seen that the entity with the identification "b0476c43" is the macro "MAX", and thus the macro "MAX" is the child entity. The fifth field (usage) contains "7" which indicates that the relationship defined by line 720 occurs on line 7 (FIG. 4) of the C program version 1 302.

The remaining lines in the relationship section 704 of VDB 308 will not be described in detail. One skilled in the art could readily understand the remaining lines in the relationship section 704 given the above description of line 720.

The contents of the directory section 706 of VDB 308 will now be described. Line 730 contains the identifier ENTITY, followed by an offset of 20 and a size of 246. The offset 20 indicates that the beginning character of the entity section 702 is the 20th character of the file. The size indicates that the length of the entity section 702 is 246 characters. Line 732 contains the identifier RELATIONSHIP, followed by an offset of 279 and a size of 74. The offset 279 indicates that the beginning character of the relationship section 704 is the 279th character of the file. The size of 74 indicates that the length of the relationship section 704 is 74 characters. Line 734 contains the identifier DIRECTORY followed by an offset of 363 and a size of 66. The offset of 363 indicates that the beginning character of the directory section 706 is the 363rd character of the file. The size of 66 indicates that the length of the directory section 706 is 66 characters.

The VDB 310 which results from applying the CIA operator 306 to the C program version two 304 is shown in FIG. 8. A detailed description of VDB 310 and FIG. 8 will not be given here. One skilled in the art would readily understand the contents of VDB 310 as shown in FIG. 8 given the above description of VDB 308.

VDB 308 and VDB 310 are input to the DBDIFF operator 312, which is an initial operator for comparing two C program databases and analyzing the differences between the two databases. DBDIFF is an initial operator because it takes two virtual databases as input, and outputs a single virtual database. Thus, with respect to the schema of the outputted single virtual database 314, the input consisting of two virtual databases can be considered as an "external format." The output of operator 312 is VDB 314 which is a virtual database which contains the difference information which results from a comparison of VDB 308 and VDB 310. Each entity and relationship in VDB 308 and VDB 310 is included in VDB 314 with a tag which indicates whether the entity or relationship is changed, deleted, added, or same. The procedure for creating VDB 314 is illustrated in FIG. 9, and the schema for VDB 314 is shown in FIG. 10.

Figure 9:
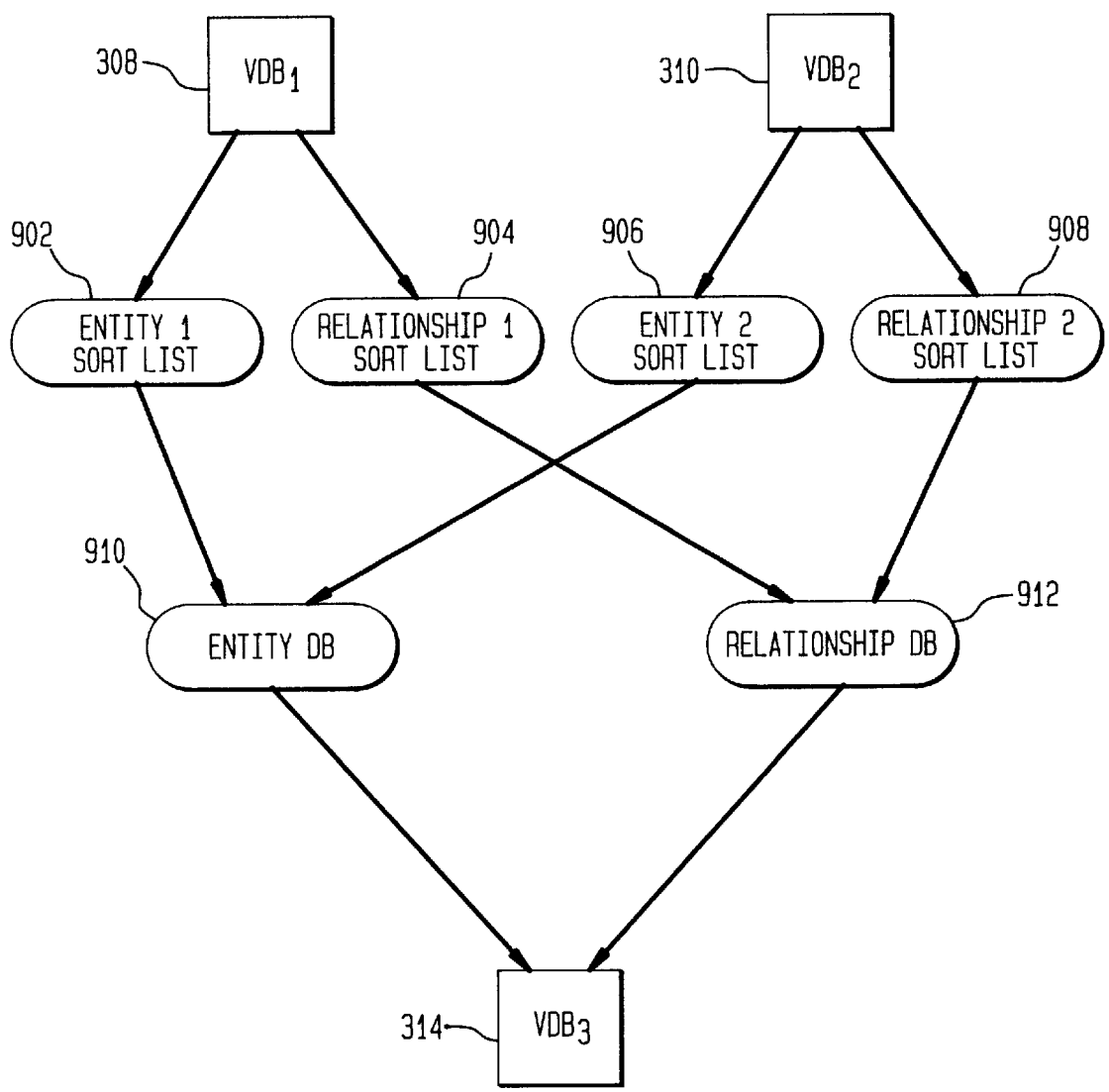
FIG. 9 illustrates the procedure for creating a virtual database containing difference information.
Figure 10:
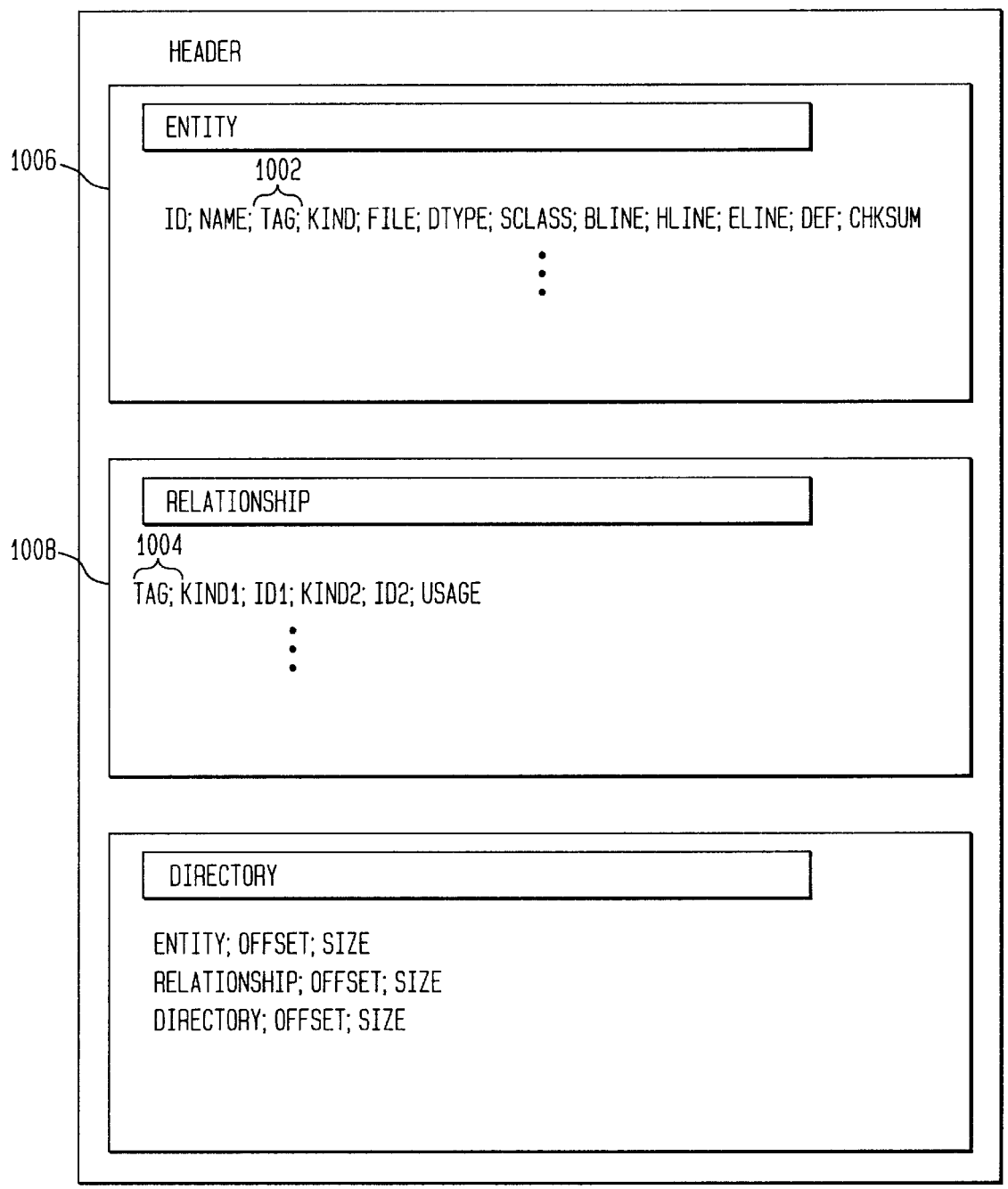
FIG. 10 shows the schema of an example virtual database.

The functioning of the DBDIFF operator 312 is described in conjunction with FIG. 9. Two lists are created from VDB 308. The entities in VDB 308 are sorted by the entity name and the sorted list is stored in entity 1 sort list 902. Each relationship in VDB 308 is sorted based on the entity id's involved in the relationship and the sorted list is stored in relationship 1 sort list 904. The entities in VDB 310 are sorted by the entity name and the sorted list is stored in entity 2 sort list 906. Each relationship in VDB 310 is sorted based on the entity id's involved in the relationship and the sorted list is stored in relationship 2 sort list 908. The sorting of the entities and relationships facilitates the pairwise comparison of entities and relationships in the lists.

With respect to the processing of entities, the comparison proceeds as follows:

For each entity which exists in entity 1 sort list 902 but does not exist in entity 2 sort list 906, the entity is stored in entity DB 910 with a tag of "deleted".

For each entity which exists in entity 2 sort list 906 but does not exist in entity 1 sort list 902, the entity is stored in entity DB 910 with a tag of "added".

For each entity which exists in both entity I sort list 902 and entity 2 sort list 906:
if the entity checksums are the same, then the entity is stored in entity DB 910 with a tag of "same";
if the entity checksums are different, then the entity is stored in entity DB 910 with a tag of "changed";

With respect to the processing of relationships, the comparison proceeds as follows:

For each relationship which exists in relationship 1 sort list 904 but does not exist in relationship 2 sort list 908, the relationship is stored in relationship DB 912 with a tag of "deleted".

For each relationship which exists in relationship 2 sort list 908 but does not exist in relationship 1 sort list 904, the relationship is stored in relationship DB 912 with a tag of "added".

For each relationship which exists in both relationship 1 sort list 904 and relationship 2 sort list 908, the relationship is stored in relationship DB 912 with a tag of "same".

After the comparison processing, entity DB 910 and relationship DB 912 are combined to create VDB 314, which is a virtual database containing the difference information.

The schema of VDB 314 is now described in conjunction with FIG. 10. The schema shown in FIG. 10 is substantially the same as the schema shown in FIG. 6, and therefor only the differences between the two schemas will be described herein. The entries in the entity section 1006 contain one extra tag field 1002. This tag field 1002 indicates whether the entity is added ("a"), changed ("c"), deleted ("d"), or same ("s"). Similarly, the entries in the relationship section 1008 contain one extra tag field 1004. This tag field 1004 indicates whether the relationship is added ("a"), deleted ("d"), or same ("s").

The contents of VDB 314 are shown in FIG. 11. Each line in the entity section 1102 of VDB 314 contains information on the entities in the two C programs 302 and 304, and contains a tag field which indicates the status of the entity. For example, line 1106 is the entry for the MIN entity. This entity is not present in C program version one 302, but is present in the C program version two 304 at line 2 (FIG. 5). Thus, entity MIN was added in the second version, and the entry in VDB 314 contains "a" in the tag field 1108 to indicate that the entity is added. As another example, line 1110 is the entry for the entity v, which is a variable. In C program version one 302, v is defined as an integer in line 2 (FIG. 4), but is not initialized. In C program version two 304, v is defined as an integer in line 3 (FIG. 5) and is initialized to MAX. Thus the entity v changed from C program version one 302 to C program version two 304, and the entry in VDB 314 contains "c" in tag field 1112 to indicate that the entity has changed.

The entries in the relationship section 1104 of VDB 312 contain information indicating the status of relationships. For example, line 1114 contains information on the relationship between the entity "main" and the entity "MAX". In C program version one 302, the entity MAX was present in the main function at line 7 (FIG. 4). Thus, in C program version one 302 there was a relationship between main and MAX, as indicated in VDB 308 at line 720 (FIG. 7), as discussed above. However, in C program version two 304, MAX is not present in the function main. Therefore, there is no entry in the relationship section of VDB 310 (FIG. 8) corresponding to line 720 in VDB 308. As a result, line 1114 of VDB 314 indicates that this relationship has been deleted with a "d" in the tag field 1118 of line 1114. Line 1116 contains information on the relationship between the entity v and the entity MAX. In C program version one 302 the variable v was defined in line 2 (FIG. 4) without reference to the entity MAX. Thus, there is no relationship between the two entities in C program version one 302. In C program version two 304 v is initialized to MAX in line 3 (FIG. 5), which results in a relationship between v and MAX. This added relationship is indicated by an "a" in the tag field 1120 of line 1116 in VDB 314. The information contained in the remaining lines of VDB 314 would be clear to one skilled in the art based on the above description.

At this point in the processing VDB 314 contains the difference information for the two versions of the C programs. However, a user may not be interested in all the difference information. Assume for purposes of this example that a user is only interested in the relationships between the function main and any other entity. In this case, a query operator could be used to filter out unwanted information and create a virtual database with only the desired information. Thus, filter operator 316 takes as input VDB 314 and creates as output VDB 318, which only contains the wanted information. Such a filter operator could be readily designed by one skilled in the art, and the details of such a filter operation are not described further herein. It is noted that operator 316 is a query operator in that it takes as input a VDB of a particular schema, and outputs a VDB of the same schema (the schema of VDB 314 and VDB 318 is that shown in FIG. 10.)

The virtual database, VDB 318, which results from the application of filter operator 316 on VDB 314 is shown in FIG. 12. As can be seen from the contents of VDB 314 (FIG. 11), the only entry in the relationship section 1104 of VDB 314 which describes a relationship which does not include the entity main is line 1116. Thus, line 1116 is removed by the filter operator 316, and line 1116 does not exist in VDB 318 shown in FIG. 12. The remaining entries in the entity sections and relationship sections of VDB 314 and VDB 318 remain the same, except for the addition of a value for the selected field.

Since VDB 318 is the output of a query operator, the selected field in the entity section records is used to indicate whether the record has been selected by the query, or if the record is included in the VDB in order to satisfy the constraint that a VDB is self contained. As described above, filter operator 316 selected only those entities that have a relationship with the entity main. These entities are: pointer, MAX, MIN, v, and end. Thus, the entity records in VDB 318 for each of these entities, and the entity main, have a "y" in the selected field. This indicates that these records were selected by the query. Record 1220, which is the record for the file entity f1.c, contains a "n" in the selected field 122. The file entity f1.c is not related to main, and therefore is not selected by the filter operator 316. However, the entity records for the entities main, pointer, MAX, MIN, v, and end, all contain a reference to the f1.c entity in their "file" field. As discussed above, in order to satisfy the self contained constraint, if a field in a VDB record makes reference to another record, the referred to record must be present in the VDB. Thus, in this example, record 1220 is included in VDB, and its selected field 1221 contains a "n" to indicate that the record was not selected by the query.

At this point in processing, it may be desirable to produce a visual representation of the information contained in VDB 318. Thus, a graph operator 320 is used to convert VDB 318 into a file which represents a directed graph. The file 322 resulting from such an operation is shown in FIG. 13. The graph operator 320 is a terminal-operator, since it takes a VDB and converts the VDB to an external format. A layout operator 324 may then convert the file 322 representing the directed graph into a directed graph layout 326. Graph layout 326 may then be printed on a printer, such as printer 222. Such a layout operator 324 is an external operator, in that it processes information in an external format and outputs information in another external format. Layout operator 324 may be constructed in accordance with the techniques described in Gansner, E. R., Koutsofios, E., North, S.C., and Vo, K.P., *A Technique for Drawing Directed Graphs*, IEEE-TSE, March 1993, which is incorporated by reference herein. Additionally, the graph layout 326 may be displayed on a computer graphics display monitor, such as monitor 202.

The directed graph layout 326 is shown in FIG. 14, and represents the information contained in VDB 318. Entities are represented by nodes of the graph and relationships between entities are represented by edges (i.e. connecting lines) of the graph. Relationship information between entities is encoded by the characteristic of connecting lines as follows:

same→solid line
added→dashed line
deleted→dotted line

The relationship between main and pointer is represented in VDB 318 by line 1202 (FIG. 12) and is represented in the layout by solid line 1402 to indicate a "same" relationship. The relationship between main and MAX is represented in VDB 318 by line 1204 and is represented in the layout by dotted line 1404 to indicate a "deleted" relationship. The relationship between main and MIN is represented in VDB 318 by line 1206 and is represented in the layout by dashed line 1406 to indicate an "added" relationship. The relationship between main and v is represented in VDB 318 by line 1208 and is represented in the layout by solid line 1408 to indicate a "same" relationship. The relationship between main and end is represented in VDB 318 by line 1210 and is represented in the layout by dashed line 1410 to indicate an "added" relationship.

The status (i.e. same, deleted, changed, added) of the entities are encoded in the shape of the nodes representing the entities as follows:

same→box
changed→parallelogram
added→ellipse
deleted→plaintext (i.e. no surrounding outline)

The entities main and v were changed, and are represented with a parallelogram. The entities pointer and MAX are the same, and are represented with a box. The entities MIN and end are added, and are represented with an ellipse.

It is noted that characteristics other than solidity of lines and shapes of nodes could be used to encode information. For example, the type of the entities could be identified using different colors. The details of the encoded information could vary depending upon the particular implementation. In one such implementation, the graph operator 320 makes use of a decoration database, which is a database which specifies the shape, style, and color of a graph node. The allowed values for shape, style, and color are determined by the particular implementation of the layout operator 324. An exemplary decoration database 1500, in accordance with the particular implementation discussed herein, is shown in FIG. 15. The first field 1502 of the decoration database 1500 indicates the tag and kind combination of the entity. The second field 1504 indicates the shape of the node to be drawn; the third field 1506 indicates the style of the node; the fourth field 1508 indicates the color of the node. For example, the first line 1510 of the database 1500 specifies that functions (p) which are the same (s) in both versions will be displayed as filled-in lightseagreen boxes. The meaning of other lines of the database 1500 would be clear to one skilled in the art, in view of the above description.

In addition to producing a visual representation of the difference information using layout operator 324 (FIG. 3), an interactive display operator may be provided such that a user may view a directed graph on a display screen and interact with the display to generate additional information. The graph file 322 is loaded into interactive display operator 328. Interactive display operator 328 may advantageously be configured as described in, North, S.C, Koutsofios, E., *Applications of Graph Visualization*, Graphics Interface '94, Banff, Alberta, 1994, pages 235–245, which is incorporated herein by reference. The interactive display operator 328 generates a graphical display 330 such that a user may view and interact with a displayed directed graph. The graphical display 330 may be displayed on a computer graphics display monitor such as monitor 202 (FIG. 2). The user interaction, such as selecting objects on the screen, may be controlled by a graphical user interface, such as mouse 206, in a manner well known in the art of graphical user interfaces.

The user can select an object on the directed graph and a menu of queries which are appropriate for the selected object will be displayed. Assume that the directed graph of FIG. 14 is being displayed as the graphical display 330. A user may select the node 1420 representing the entity v, and the directed graph of FIG. 16 would be displayed. Menu 1604 is displayed which lists the available queries for the selected node. In the example shown, there are three queries available for user selection: relationship, diff old & new, and focus. These queries perform the following operations:

relationship:
Computes and graphically displays all the relationships that either start or terminate with the selected entity. Whether the operator will compute the relationships that start or terminate with the selected entity is determined by a user selection.

diff old & new:
Computes and displays the line-by-line difference between the text of the old and new versions of the selected entity.

focus:
Computes and displays all the entities related to the selected entity through one or more layers of relationships. For example, if entity A is related to entity B, and entity B is related to entity C, a focus query on entity A will display entities A, B and C, and will show the relationship between entities A and B and entities B and C.

It is noted that this list of possible interactive queries is for example purposes only, and other queries could also be provided by interactive display operator 328. When a user interactively selects a query from menu 1604, the interactive display operator 328 automatically constructs a virtual database pipeline of query operators to perform the desired query. Such a virtual database pipeline of query operators may be constructed in a manner similar to that described above in conjunction with FIG. 3. The interactive display operator 328 then initiates execution of the operators and graphically displays the results.

Figure 17:
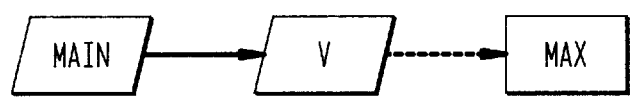
FIG. 17 shows an example display of a directed graph.

For example, with reference to FIG. 16, assume the user selects the focus query from menu 1604. This indicates that the user wants to view all relationships between the entity v and any other entity. The interactive display operator 328 would construct and execute the appropriate set of query operators. The resulting display from such a query is shown in FIG. 17. FIG. 17 shows that entity v has a relationship with the entity main and the entity MAX. This relationship is shown in lines 1116 and 1122 of VDB 314 (FIG. 11). As discussed above, VDB 314 contains the difference information which results from a comparison of VDB 308 and VDB 310. Line 1116 identifies the relationship between v and MAX, and line 1122 identifies the relationship between v and main.

Figure 18:
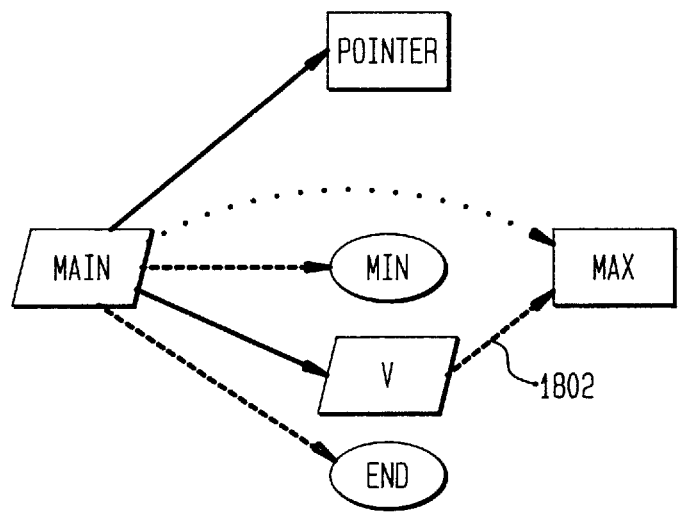
FIG. 18 shows an example display of a directed graph.

The example display of FIG. 17 shows a new directed graph representing the results of the interactive query. As an alternative, the results of the interactive query could be displayed integrated with the existing display of FIG. 16. This alternative display is shown in FIG. 18. Thus, in FIG. 18, the relationship between v and MAX, represented by line 1802, has been added to the directed graph. This relationship was not shown in the display of FIG. 16, because line 1116 of VDB 314, which identifies the relationship between v and MAX, was removed by the filter operator 316.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, it is noted that the advantages of graphically analyzing document difference information may be realized in a manner other than the design shown in FIG. 3 which utilizes virtual databases. The function of comparing two documents and generating document difference information may be performed by a document comparator, which may be, for example, a software program which compares two documents and generates difference information. Such a document comparator would perform functions similar to those of operators 306 and 312 to generate such data, but may do so in a manner different than that of operators 306 and 312. Such difference information generated by a document comparator may be further processed by, for example, a graph operator and a layout operator, to graphically display the document difference data.

We claim:

1. A data processing apparatus comprising:
a plurality of query operators, each of said query operators configured to receive a first virtual data base having a schema, for processing data in said virtual database, and for outputting a second virtual database reflecting said processing and having said schema; and means for combining at least two of said query operators to create an application.

2. The apparatus of claim 1 wherein said means for combining further comprises a virtual database pipeline.

3. The apparatus of claim 1 wherein said query operators are combinable in any order to create an application.

4. The system of claim 1 further comprising:

an initial operator for converting source information in an external format into a virtual data base having said schema.

5. The system of claim 1 further comprising:

a terminal operator for converting a virtual database into an external format.

6. The system of claim 5 wherein said external format is a file describing a directed graph.

7. A data processing apparatus comprising:

a first software operator for receiving a first virtual database having a first schema, for processing data in said first virtual database, and for outputting a second virtual database having said first schema; and a second software operator for receiving said second virtual database, for processing data in said second virtual database, and for outputting a third virtual database having said first schema.

8. The apparatus of claim 7 further comprising:

an initial operator for converting source information in an external format into a virtual database having said first schema.

9. The apparatus of claim 7 further comprising:

a terminal operator for converting a virtual database to an external format.

10. The apparatus of claim 7 wherein said first and second operators are chosen from a library of operators, and wherein each of said operators in said library are configured to receive a virtual database having said first schema, process information in said received virtual database, and output a virtual database having said first schema.

11. The apparatus of claim 7 further comprising:

a virtual database pipeline for passing said virtual databases between operators.

12. An apparatus for processing source information comprising:

an initial operator for receiving said source information in an external format, for processing said source information, and for outputting a first virtual database having a first schema;

at least one query operator for receiving from said initial operator the first virtual database having the first schema, for processing information in said virtual database received from said initial operator, and for outputting a second virtual database having the same schema as said first virtual database received from said initial operator; and a terminal operator for receiving the second virtual database from said query operator, for processing information in said second virtual database received from said query operator, and for outputting information reflecting said processing in an external format.

13. The apparatus of claim 12 further comprising:

an external operator for processing said information in said external format.

14. A method for processing information comprising the steps of:

providing a plurality of software operators each configured to receive a virtual database having a first schema, for processing information contained in said virtual database, and for outputting a virtual database having said first schema; and combining at least two of said software operators to create an application.

15. The method of claim 14 wherein said step of combining further comprises the step of:

providing a virtual database pipeline.

16. The method of claim 14 further comprising the step of:

providing an initial operator for converting source information into a virtual database having said first schema.

17. The method of claim 14 further comprising the step of:

providing a terminal operator for converting a virtual database having said first schema into an external format.

18. An apparatus for analyzing the differences between a first document and a second document, each of said documents comprising entities, the apparatus comprising:

an abstractor operator for converting said first and second documents into a first virtual database and a second virtual database respectively, each of said virtual databases containing information describing entities and relationships between entities;

a difference operator for comparing said first and second virtual databases and for creating a third virtual database containing difference information.

19. The apparatus of claim 18 further comprising:

a terminal operator for converting said third virtual database into an external format.

20. The apparatus of claim 18 wherein said external format describes a directed graph.

21. The apparatus of claim 18 wherein said first, second, and third virtual databases each further comprises: an entity section containing a plurality of records, each of said records describing an entity; and a relationship section containing a plurality of records, each of said records describing a relationships between entities.

22. The system of claim 21 wherein:

each of said records in said entity section of said third virtual database further comprises a tag field indicating the status of an entity; and each of said records in said relationship section of said third virtual database further comprises a tag field indicating the status of a relationship.

23. A method for analyzing the difference between a first document and a second document comprising the steps of:

a) applying an initial operator to said first document to produce a first virtual database containing information describing entities in said first document and relationships between entities;

b) applying an initial operator to said second document to produce a second virtual database containing information describing entities in said second document and relationships between entities;

c) applying a differencing operator to said first and second virtual databases and creating a third virtual database, said third database containing difference information.

24. The method of claim 23 further comprising the step of:

d) applying a terminal operator to said third database to create an external format file.

25. The method of claim 24 further comprising the step of:

applying a filter operator to said third virtual database between steps c) and d).

26. The method of claim 24 wherein said external format file describes a directed graph, the method further comprising the step of:

printing said directed graph.

27. The method of claim 24 wherein said external format file describes a directed graph, the method further comprising the step of:

displaying said directed graph on a display monitor.

28. An apparatus for graphically analyzing the difference between a first document and a second document, each of said documents comprising entities, wherein the structure of said documents defines relationships between said entities, the apparatus comprising:

a document comparator for comparing said first document and said second document and for generating difference data which represents the difference between the entities and relationships of said first document and said second document; and a layout operator responsive to said difference data for generating a directed graph layout, said directed graph layout including nodes and edges connecting said nodes, wherein said nodes represent entities and said edges represent relationships between entities.

29. The apparatus of claim 28 wherein the status of said entities is encoded by a characteristic of said nodes and the status of said relationships is encoded by a characteristic of said edges.

30. The apparatus of claim 29 wherein said characteristics are defined by a decoration database.

31. The apparatus of claim 28 wherein said difference data is contained in a virtual database, said document comparator further comprising:

an abstractor operator for converting said first and second documents into a first virtual database and a second virtual database respectively, each of said virtual databases containing information describing entities and relationships between entities; and a difference operator for comparing said first and second virtual databases and for creating a third virtual database containing said difference data.

32. The apparatus of claim 28 further comprising:

a printer for generating a printout of said directed graph layout.

33. The apparatus of claim 28 further comprising:

a graphical display monitor for displaying said directed graph layout.

34. An apparatus for graphically analyzing the difference between a first document and a second document, each of said documents comprising entities, wherein the structure of said documents defines relationships between said entities, the apparatus comprising:

a document comparator for comparing said first document and said second document and for generating difference data which represents the difference between the entities and relationships of said first document and said second document;

an interactive display operator responsive to said difference data for displaying a directed graph on a display screen and for initiating a query in response to user interaction with said directed graph, said directed graph including nodes and edges connecting said nodes, wherein said nodes represent entities and said edges represent relationships between entities.

35. The apparatus of claim 34 wherein said difference data is contained in a virtual database, said document comparator further comprising:

an abstractor operator for converting said first and second documents into a first virtual database and a second virtual database respectively, each of said virtual databases containing information describing entities and relationships between entities; and a difference operator for comparing said first and second virtual databases and for creating a third virtual database containing said difference data.

36. A method for graphically analyzing the difference between a first document and a second document, each of said documents comprising entities, wherein the structure of said documents defines relationships between said entities, the method comprising the steps of:

comparing said first document and said second document and generating difference data which represents the difference between the entities and relationships of said first document and said second document;

converting said difference data into a directed graph layout, said directed graph layout including nodes and edges connecting said nodes, wherein said nodes represent entities and said edges represent relationships between entities.

37. The method of claim 36 further comprising the step of:

encoding entity status using a characteristic of said displayed node and encoding relationship status using a characteristic of said displayed edges.

38. The method of claim 37 wherein said characteristic of said displayed node is defined by a decoration database.

39. The method of claim 37 wherein said characteristic of said displayed node is the shape of said node.

40. The method of claim 37 wherein said characteristic of said displayed node is the color of said node.

41. The method of claim 37 wherein said characteristic of said displayed edge is the solidity of said edge.

42. The method of claim 36 further comprising the step of: printing said directed graph layout on a printer.

43. The method of claim 36 wherein said difference data is contained in a virtual database, said method further comprising the steps of:

converting said first and second documents into a first virtual database and a second virtual database respectively, each of said virtual databases containing information describing entities and relationships between entities; and comparing said first and second virtual databases and creating a third virtual database containing said difference data.

44. The method of claim 36 further comprising the step of:

displaying said directed graph layout on a graphical display monitor.

45. The method of claim 44 further comprising the step of:

initiating a query in response to user interaction with said directed graph.

46. The method of claim 45 further comprising the step of:

displaying the results of said query on said graphical display monitor.

* * * * *